G. H. SMITH.
MACHINE FOR MAKING WIRE FABRIC.
APPLICATION FILED SEPT. 29, 1909.

1,050,246.

Patented Jan. 14, 1913.
10 SHEETS—SHEET 1.

WITNESSES

INVENTOR
Geo. H. Smith.
by Bakewell, Byrnes & Parmelee,
his Attys.

G. H. SMITH.
MACHINE FOR MAKING WIRE FABRIC.
APPLICATION FILED SEPT. 29, 1909.

1,050,246.

Patented Jan. 14, 1913.
10 SHEETS—SHEET 8.

WITNESSES
R. A. Balderson.
Walter Tamariss

INVENTOR
Geo. H. Smith
by Bakewell, Byrnes & Parmelee,
his Attys.

G. H. SMITH.
MACHINE FOR MAKING WIRE FABRIC.
APPLICATION FILED SEPT. 29, 1909.

1,050,246.

Patented Jan. 14, 1913.
10 SHEETS—SHEET 9.

WITNESSES
R. A. Balderson
Walter Famaris

INVENTOR
Geo. H. Smith,
by Bakewell, Byrnes & Parmelee.
his Attys.

G. H. SMITH.
MACHINE FOR MAKING WIRE FABRIC.
APPLICATION FILED SEPT. 29, 1909.

1,050,246.

Patented Jan. 14, 1913.
10 SHEETS—SHEET 10.

WITNESSES
INVENTOR

UNITED STATES PATENT OFFICE.

GEORGE HENRY SMITH, OF WORCESTER, MASSACHUSETTS, ASSIGNOR TO THE AMERICAN STEEL AND WIRE COMPANY OF NEW JERSEY, OF HOBOKEN, NEW JERSEY, A CORPORATION OF NEW JERSEY.

MACHINE FOR MAKING WIRE FABRIC.

1,050,246.  Specification of Letters Patent.  Patented Jan. 14, 1913.

Application filed September 29, 1909. Serial No. 520,152.

*To all whom it may concern:*

Figure 1:
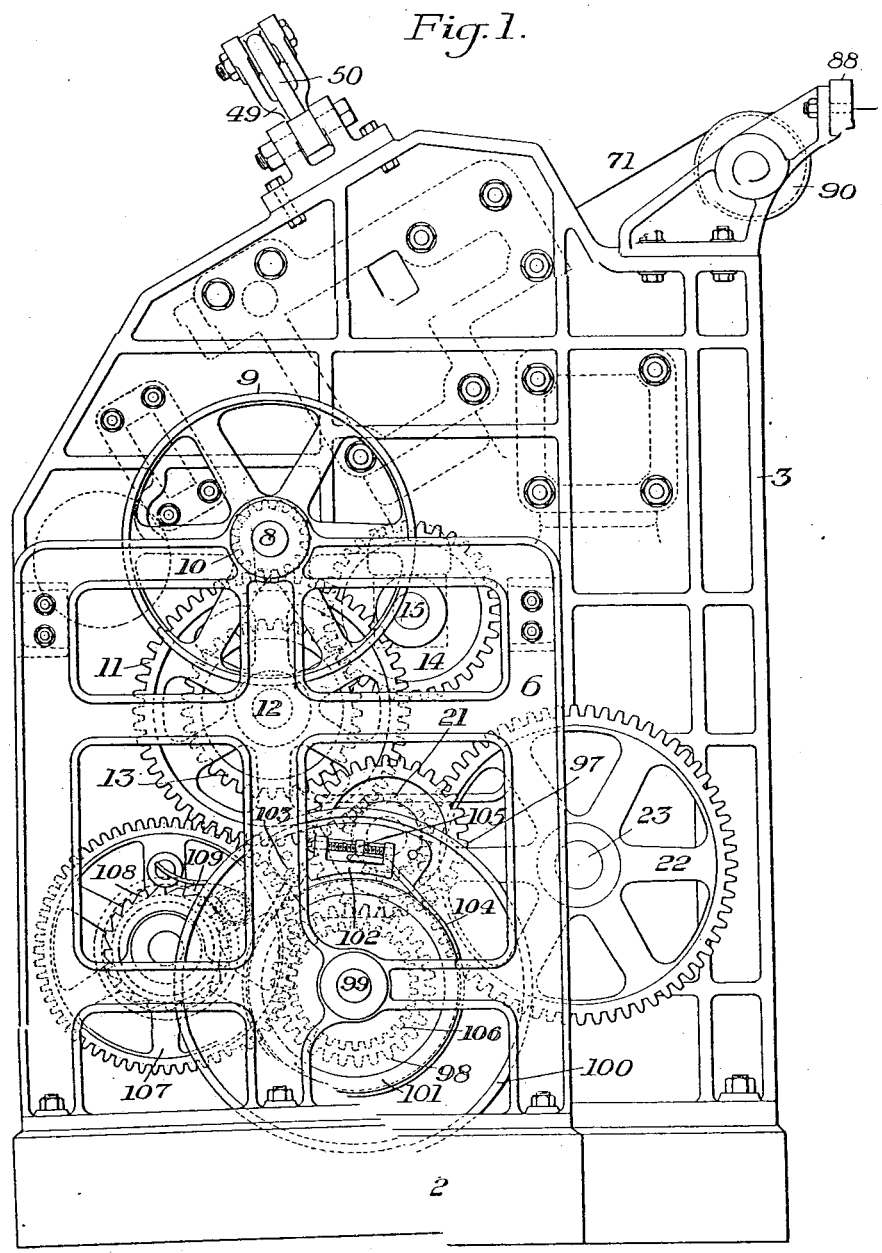
Figure 2:
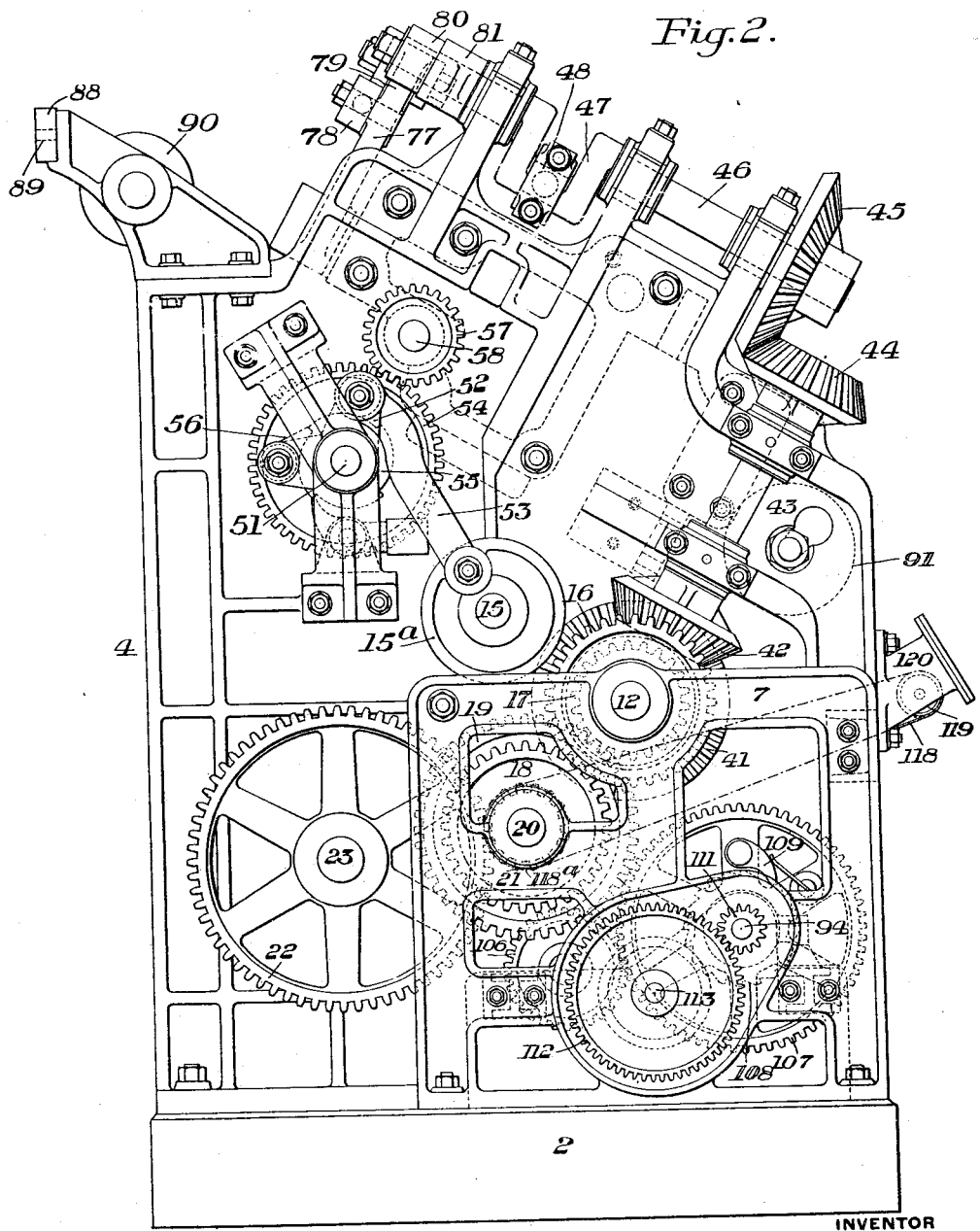
Figure 3:
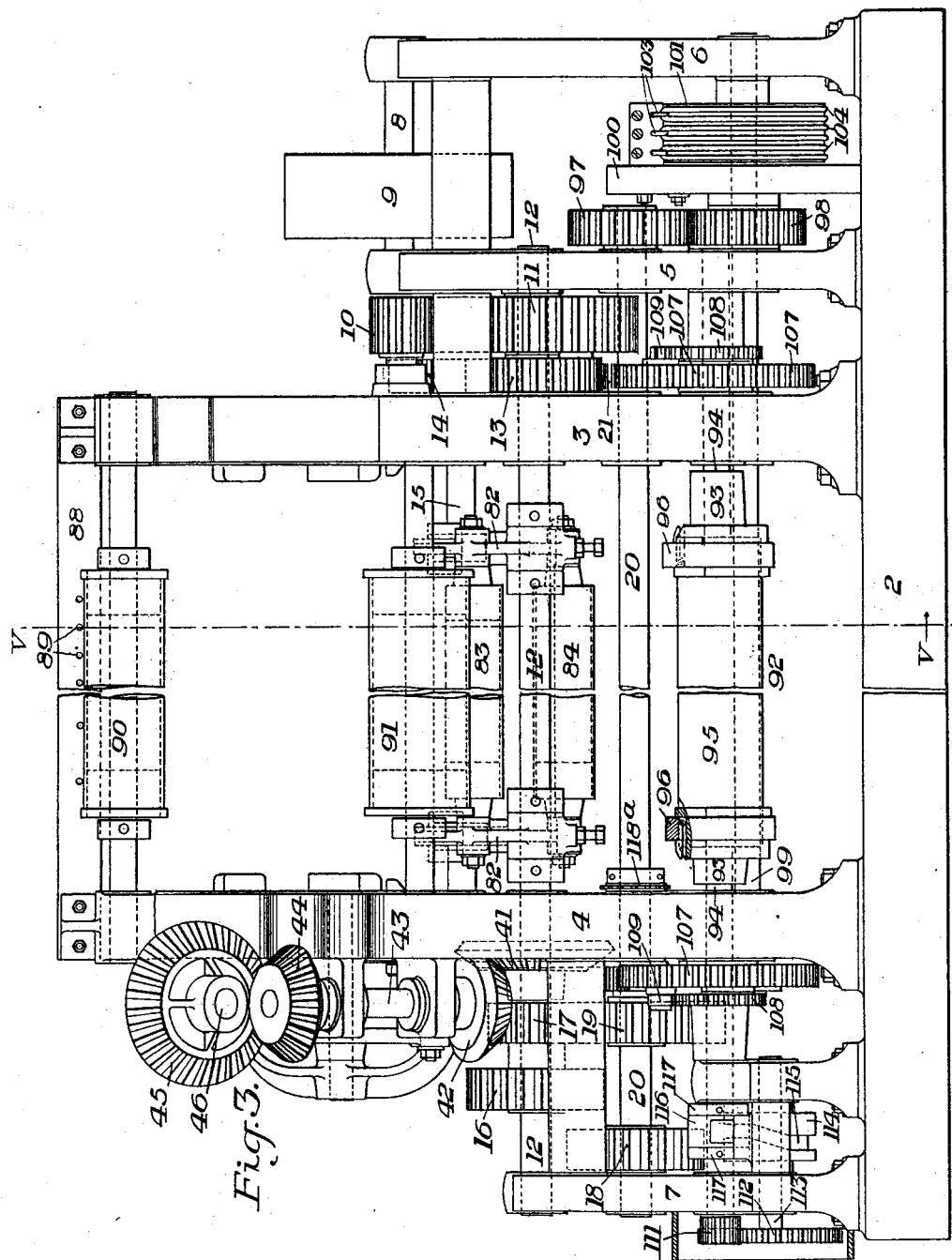
Figure 4:
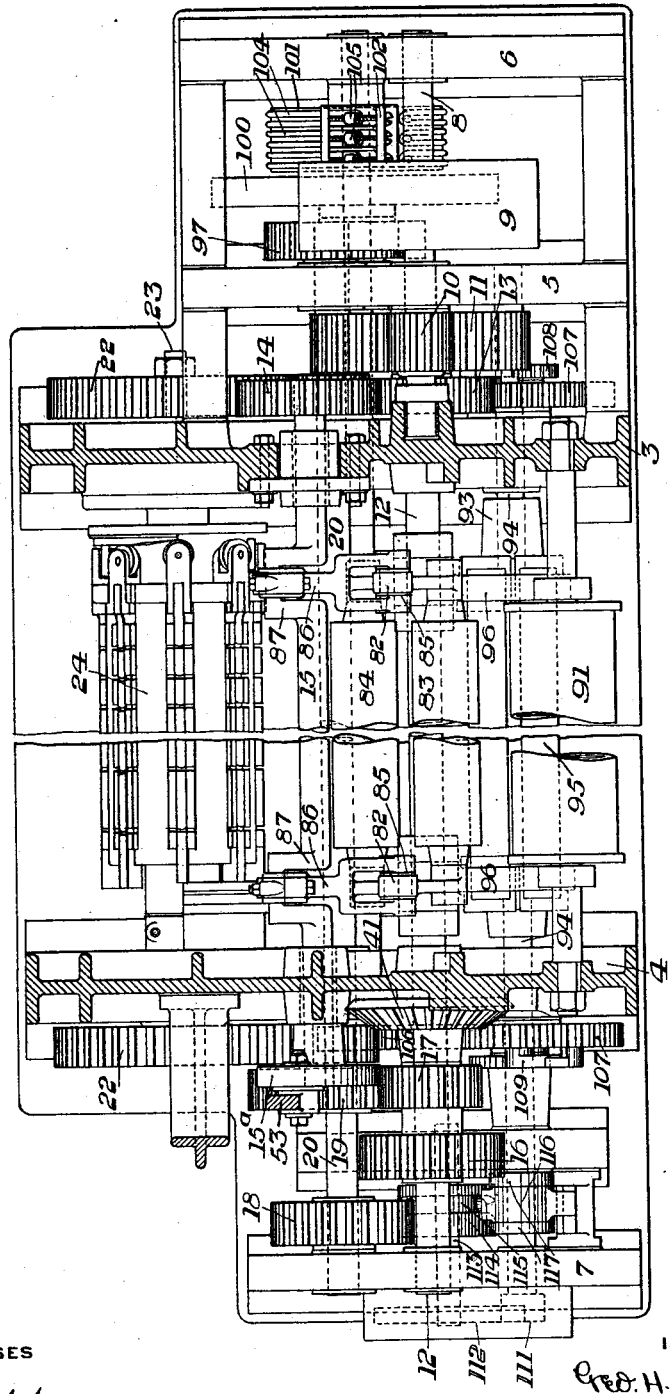
Figure 5:
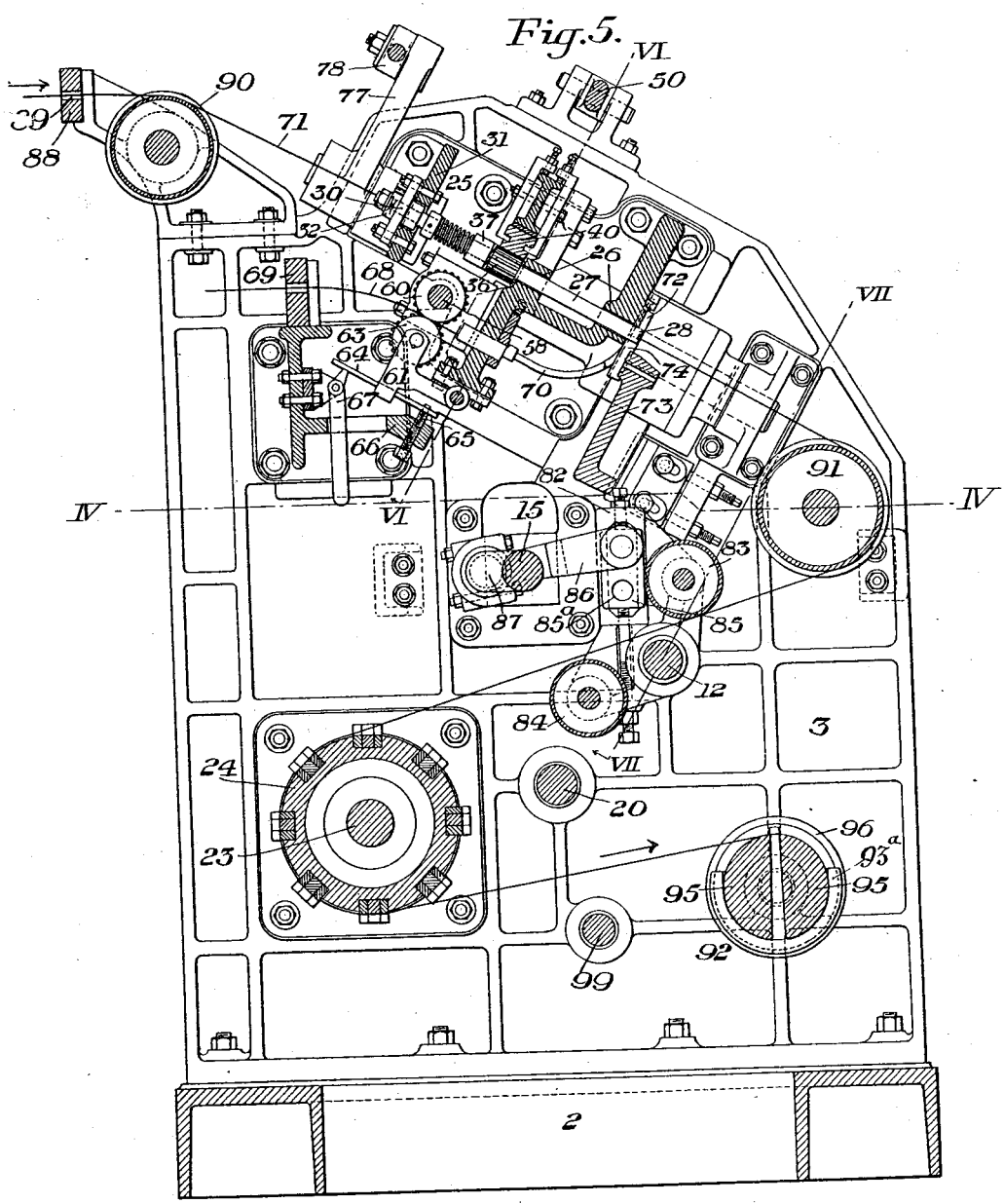
Figure 6:
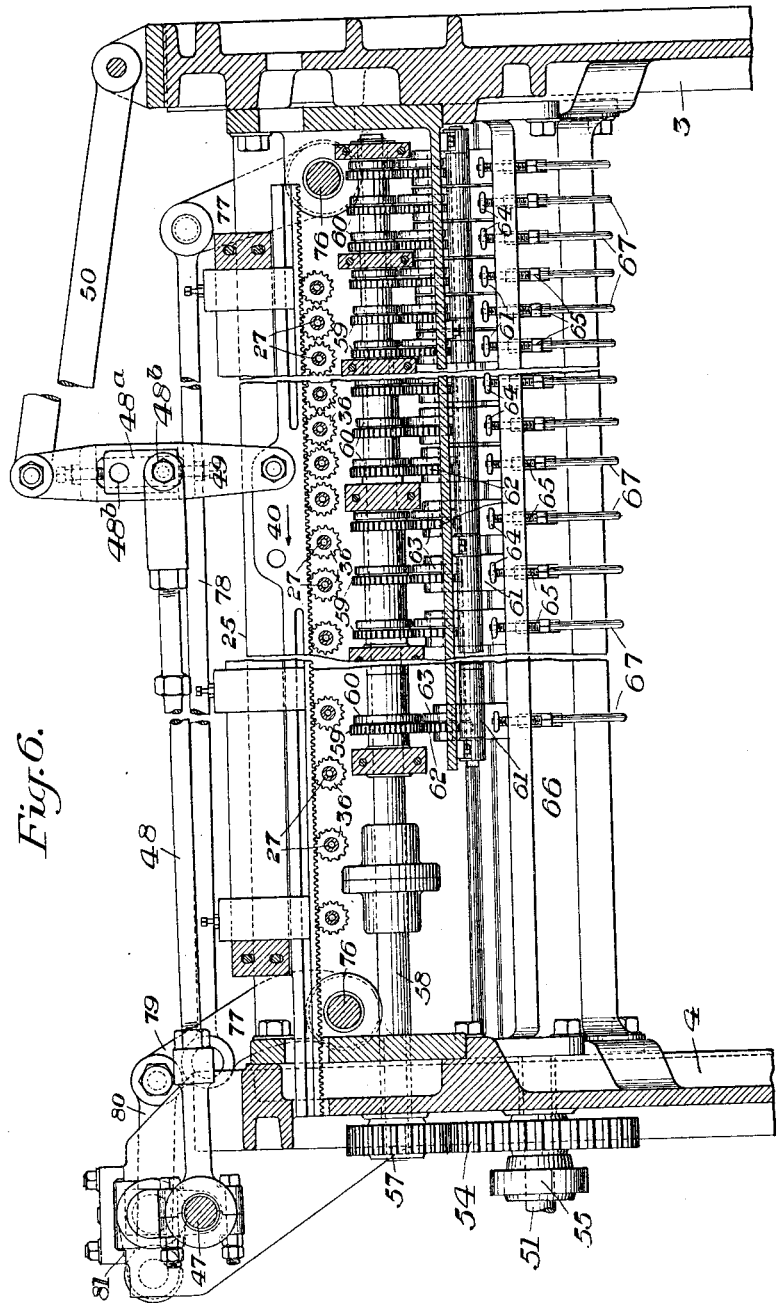
Figure 7:
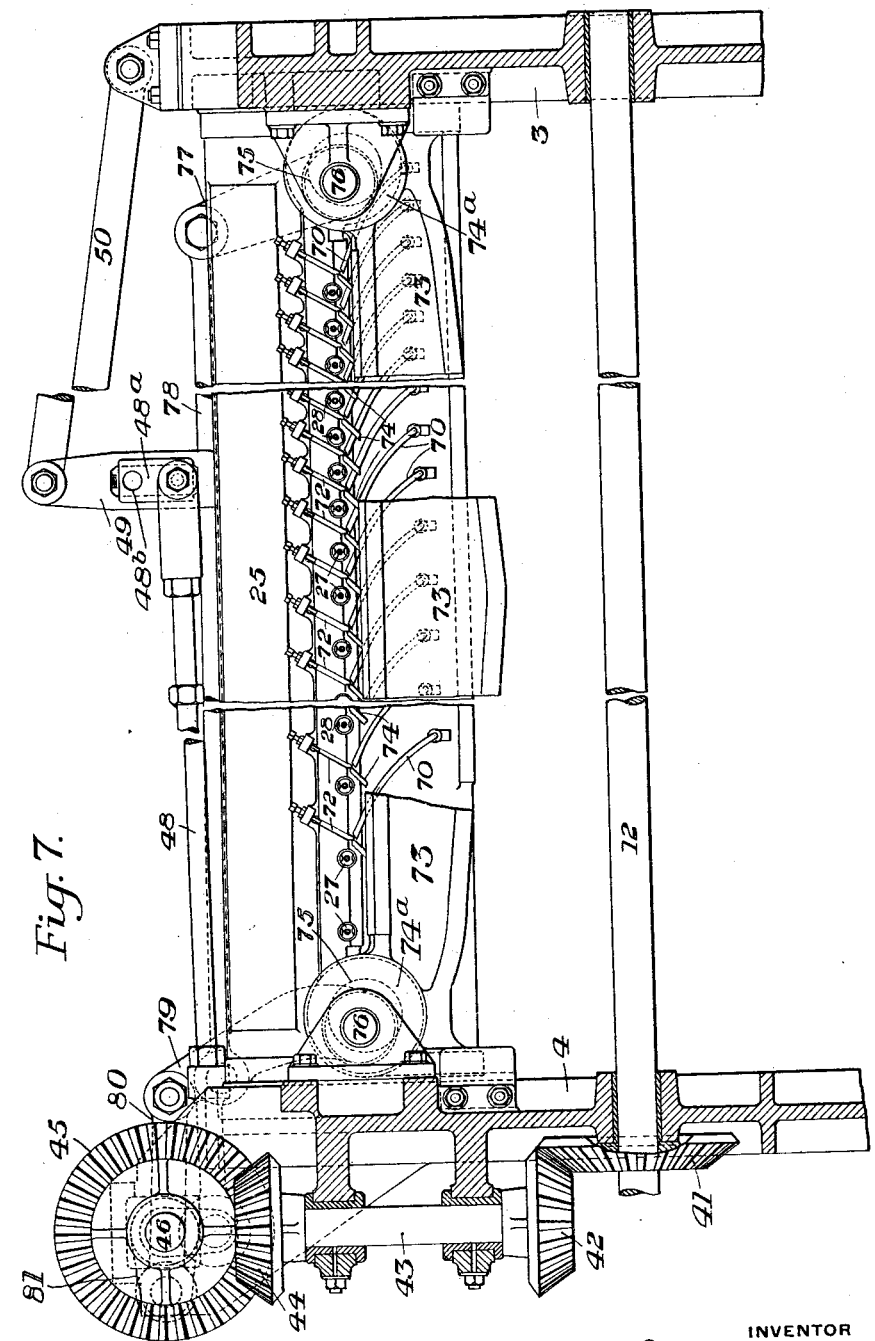
Figure 8:
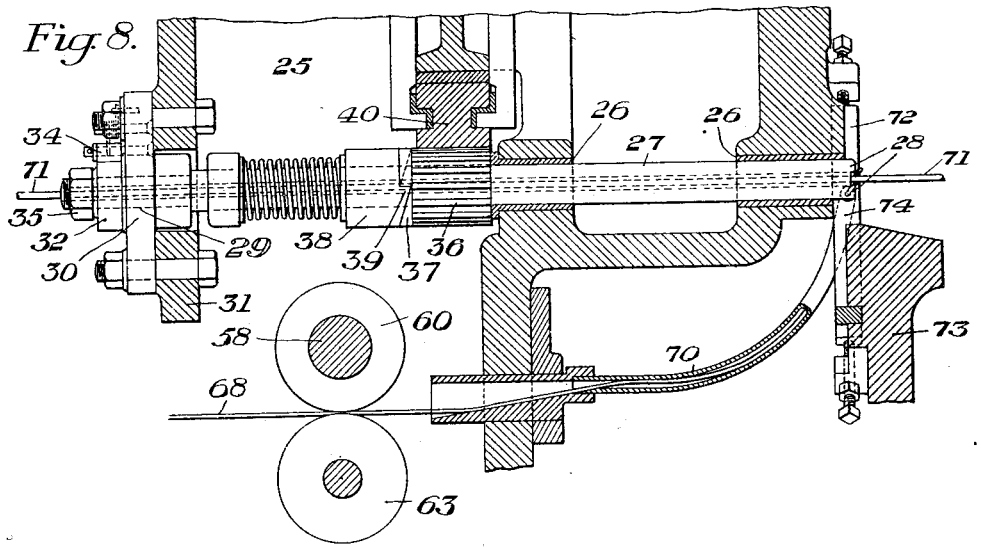
Figure 9:
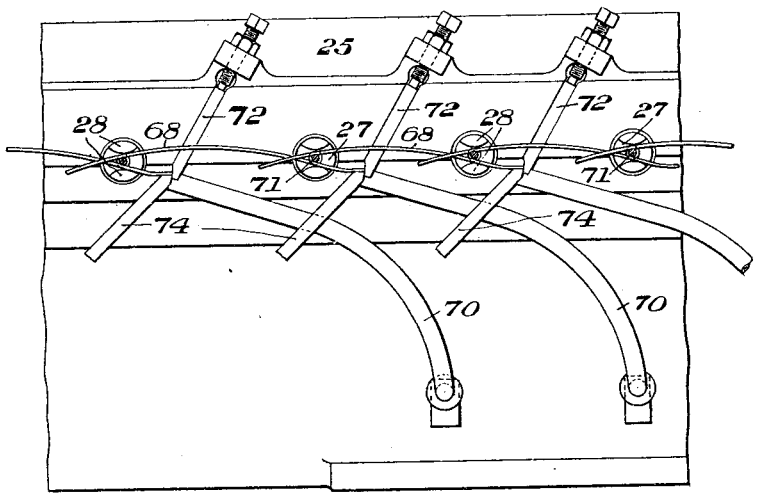
Figure 11:
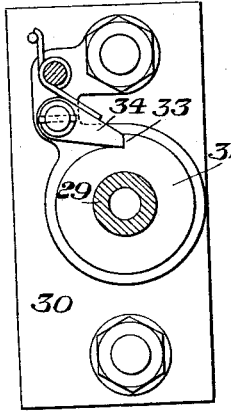
Figure 10:
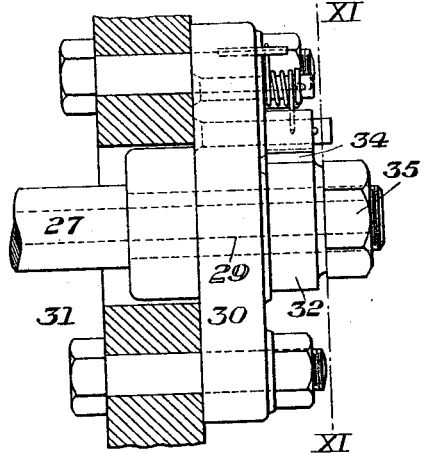
Figure 12:
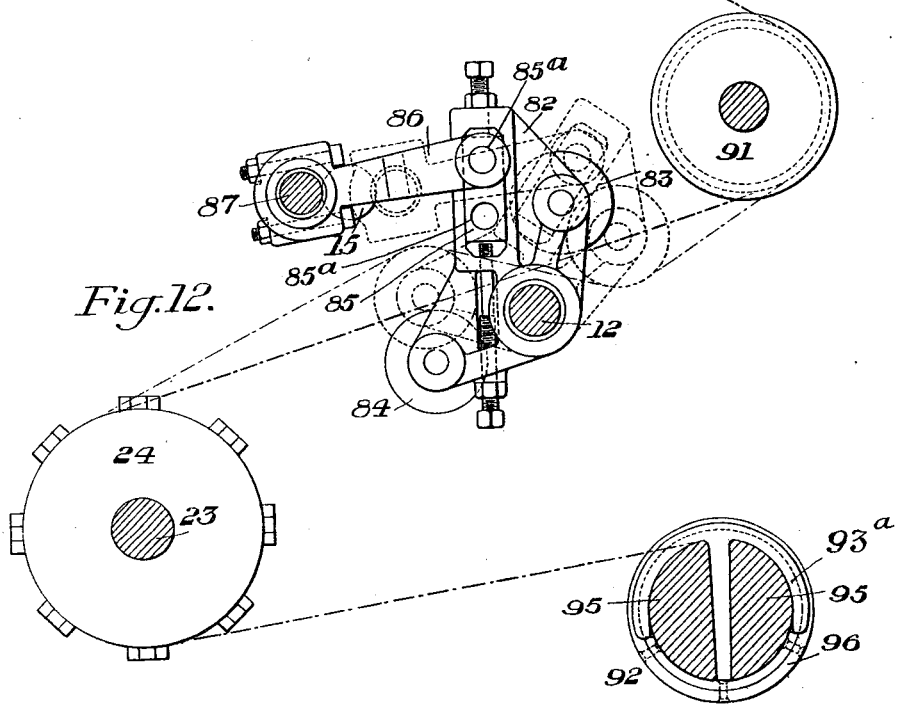
Figure 14:
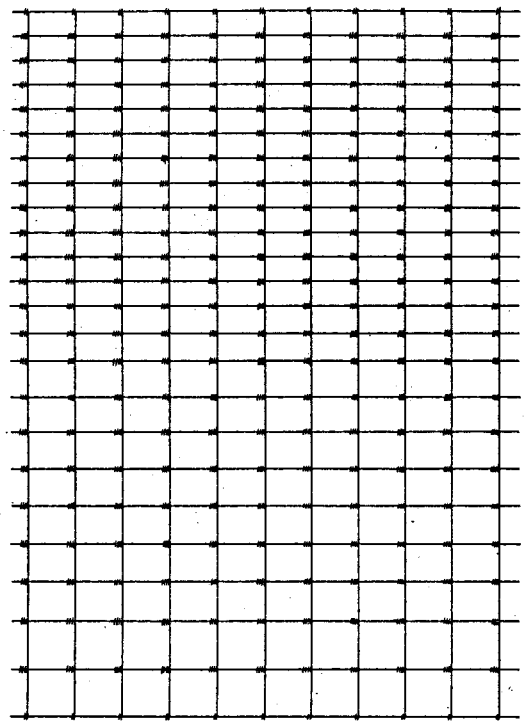
Figure 13:
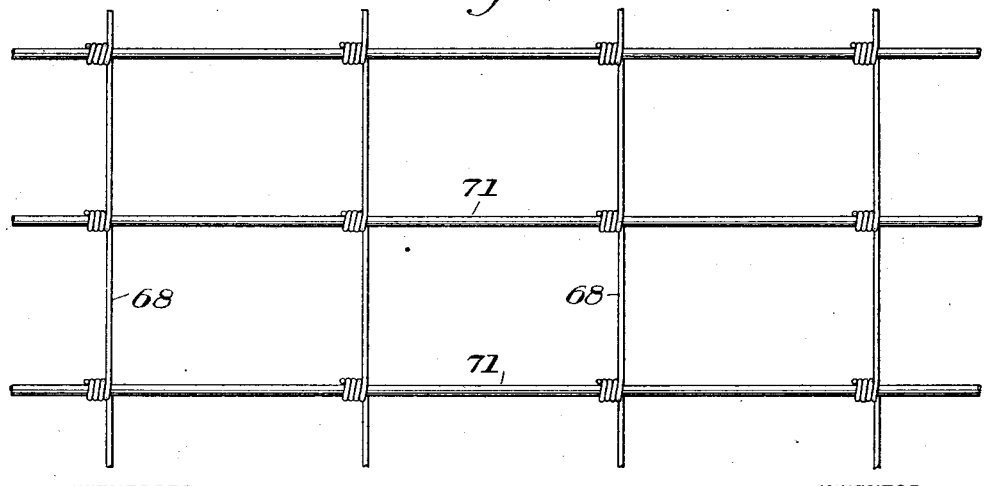

Be it known that I, GEORGE HENRY SMITH, of Worcester, Worcester county, Massachusetts, have invented a new and useful Machine for Making Wire Fabric, of which the following is a full, clear, and exact description, reference being had to the accompanying drawings, forming part of this specification, in which—
Figure 1 is a side elevation of one form of my improved machine for making continuous lengths of wire fence or fabric; Fig. 2 is a similar view from the other side of the machine; Fig. 3 is a rear view with the stay wire cutting, twisting and feeding mechanism omitted; Fig. 4 is a sectional plan view on the line IV—IV of Fig. 5; Fig. 5 is a sectional view through the whole machine on the line V—V of Fig. 3; Fig. 6 is a sectional view on the line VI—VI of Fig. 5, showing the coiling spindles and stay wire feeding mechanism; Fig. 7 is a similar view on the line VII—VII of Fig. 5, showing the stay wire cutting mechanism; Fig. 8 is an enlarged sectional view of one of the stay wire twisting spindles; Fig. 9 is an end view of the same; Fig. 10 is a detail side elevation of the end portion of one of the stay wire twister spindles; Fig. 11 is a section on the line XI—XI of Fig. 10; Fig. 12 is a diagrammatic view showing the operation of the vibrator in connection with the pull-out and winding drums; Fig. 13 is a view of the fabric showing three strand wires and four stay wires, and Fig. 14 is a view of the fabric on a reduced scale showing the full width thereof.

My invention relates to an improvement in wire fence or fabric machines for making a fabric which is provided with a plurality of continuous strand wires, each of which is tied to an adjacent strand wire by means of stay wires which are cut in short lengths, each length of the stay wire over-lapping two of the strand wires, and whose ends are twisted or coiled around the strand wires.

The object of my invention is to provide a machine of this character in which the operating parts are horizontally disposed, and are suitably mounted in a rigid frame, and are arranged in such a manner that they are accessible from all sides, and from the base on which the machine is mounted.

In my improved machine all of the strand wires are fed to the machine in the same horizontal plane, thereby providing a machine in which all of the strand wires are accessible, irrespective of the width of the fabric. The gearing and driving mechanism is located near the base plate on rigid frames, which permits of a high speed, and consequently a relatively high capacity for work.

Another object of my invention is to provide a vibrator of novel character, having two rolls which engage opposite sides of the fabric. These rolls are suitably mounted in an oscillating frame which is actuated after the twisting of each line of stay wires, to advance the fabric prior to the twisting of the next set of stay wires. Heretofore this advancing of the fabric was done by a single roller, which necessitated a greater movement of the vibrator to advance the fabric a sufficient distance for the addition of the next stay wires.

Another object of my invention is to provide a combined supporting frame for supporting the twisting spindles and the cutter frame and cutters for cutting the stay wires.

A further object of my invention is to so support the twisting spindles within this frame that each of said spindles may readily be removed from the frame without removing any of the various other parts of the machine.

Another object of my invention is to provide a simple and efficient strand wire tension device, which consists of a plain roll, which is adapted to receive one coil of each of the strand wires, which are guided to said tension roll by means of a guide bar having a suitable guide therein for each strand wire. Further, in the provision of positively actuated feed rolls for each strand wire, each of which is provided with a tension device which can be readily regulated to apply the proper tension to its strand wire, and which can also be thrown out of action to obtain access to these parts to insert a new piece or coil of wire.

Still another object of my invention is to provide an improved frictional drive for the take-up drum, or the reel for coiling the finished fabric, which drum is provided with a frictional band-wheel, and a rotatable member loosely mounted on the shaft of the band-wheel, and adjustable frictional driving means between the band-wheel and the rotatable member.

The precise nature of my invention will be best understood by reference to the accompanying drawings which will now be described, it being premised, however, that various changes may be made in the details of construction and general arrangement of the parts, without departing from the spirit and scope of my invention, as defined in the appended claims.

Referring to the accompanying drawings, the numeral 2 designates a suitable base plate which may be secured to any suitable foundation. Rigidly secured to the base plate 2 are the housings 3 and 4.

5 and 6 are frames which are also secured to the base plate 2 on the outside of the housing 3, and 7 is a frame secured to the base plate 2 beyond the housing 4. Journaled in the housing 3 and frames 5 and 6 is a driving shaft 8, which is provided with a driving pulley 9; and rigidly secured to this shaft 8 between the housing 3 and frame 5 is a pinion 10 which meshes with a gear wheel 11 on a shaft 12, which extends through the housings 3 and 4 and the frame 7. Secured to the shaft 12 is a gear wheel 13 which meshes with a similar gear wheel 14 on a shaft 15, which also extends through both housings, and is provided with a disk 15ª on the other end thereof.

The shaft 12 is provided with the gears 16 and 17 which are adapted to engage gear wheels 18 and 19, respectively, which are splined on a shaft 20. When the gear wheels 16 and 18 are in mesh with each other, the shaft 20 will be rotated at a proper speed for making a fabric of wide mesh or whose stay wires are a considerable distance apart, and when the gear wheels 17 and 19 are in mesh with each other, the shaft 20 will be driven at a slower rate of speed, and consequently make a fabric of finer mesh or whose stay wires are proportionately closer to each other. Rigidly secured to each end of the shaft 20 is a pinion 21, and each of these pinions meshes with a gear 22 on the end of a shaft 23. Mounted on this shaft 23, between the housings 3 and 4, is the fabric pull-out drum 24.

25 is a frame which is mounted between the housings 3 and 4, and is provided with a series of orifices or bearings 26. Mounted in each of these bearings 26, is a hollow spindle 27, the outer end of which is provided with diametrically opposite projections 28, which are adapted to engage the ends of the stay wires which are to be twisted around a strand wire which passes through the bore of the spindle 27. The other end of this spindle is reduced as shown at 29, and rotates in a bearing 30, which is secured to a bar 31, which is in turn secured to the housings 3 and 4, and is an integral part of the frame 25. The outer end of this reduced portion of the spindle 27 is provided with a ratchet wheel 32 having a single tooth 33, which is engaged by a spring-pressed pawl 34 pivotally mounted on the bearing 30.

35 is a nut on the screw-threaded end of the spindle 27 to retain the ratchet wheel 32 in proper relation with the spindle and journal box. Loosely mounted on the spindle 27 is a pinion 36 provided with clutch teeth 37, and splined on the spindle 27 is a spring-pressed collar 38 positively rotated therewith and capable of a longitudinal movement thereon. The outer end of said collar is provided with clutch teeth 39 adapted to be engaged by the clutch teeth 37 on the pinion 36. Mounted in a suitable guide in the frame 25, is a rack 40 which meshes with the teeth of the pinions 36 on the spindles 27. During the movement of this rack-bar in the direction of the arrow on Fig. 6, the spindles 27 will be rotated by the movement of the rack-bar, and on the return movement of this rack-bar each spindle will be restrained from movement by means of a pawl 34 engaging the ratchet wheel 32, and the clutch teeth 37 on the pinion 36 will pass over the clutch teeth 39 on the sleeve 38, for the purpose hereinafter described.

Mounted on one end of the shaft 12 is a bevel gear 41 which meshes with a bevel gear 42 on a shaft 43 rotatably mounted in suitable bearings on the housing 4. The upper end of this shaft 43 is provided with a bevel gear 44 meshing with the bevel gear 45 on a crank shaft 46 which is journaled in bearings formed integrally with the upper end of the housing 4. This shaft 46 is provided with a crank 47, to which is connected one end of the connecting rod 48, connected at its opposite end to one of two holes 48ᵇ in a block 48ª, which is adjustably mounted in a lever 49, one end of which is connected to the rack-bar 40. The other end thereof is connected to one end of a link 50 which is pivotally connected to the housing 3. The crank shaft 46 is rotated through the previously described train of gears from the shaft 12, and in turn imparts a reciprocating motion to the rack-bar 40 by means of the crank 47 and its lever connections. By changing the connection between the rod 48 and block 48ª, the stroke of the rack-bar can be varied, and thereby vary the number of rotations of the coiling spindles.

Mounted in a suitable bracket secured to the housing 4, and also in the housing 4, is a short shaft 51; and loosely mounted on this shaft is a ratchet arm 52, which is connected by means of a link 53 with a pin on the crank disk 15ª. Loosely mounted on the shaft 51 and adjacent to the ratchet arm 52, is a gear wheel 54, and formed integrally therewith is a ratchet wheel 55 which is engaged by a pawl 56 mounted on the ratchet arm 52.

57 is a pinion secured to a shaft 58, and which is in mesh with the gear wheel 54. The ratchet wheel 55 is provided with four teeth and the gear wheel 54 is twice the diameter of the pinion 57. The stroke of the crank disk 15ª is sufficient to oscillate the pawl arm 52 the necessary distance to advance the ratchet wheel one tooth for each reciprocation, and therefore the shaft 58 will be rotated one-half of a circle for each rotation of the shaft 15.

The shaft 58 is provided with a plurality of gear wheels 59 which are rigidly secured thereto, and adapted to be rotated thereby, and 60 are disks which are secured to the gear wheels 59. These gear wheels and disks are for feeding the stay wires for the fabric, and as each of the feeding devices is a duplicate of the others, I will only describe one of them.

Mounted in a frame 61 is a gear wheel 62, to which is connected a disk 63, which is in line with the disk 60, the gear wheel 62 meshing with one of the gear wheels 59, and positively driven thereby to feed one of the stay wires, as clearly shown in Fig. 5. The frame 61 is pivotally mounted upon the frame 25.

64 is a leaf spring which is attached to the lower end of the frame 61, one end of which spring bears against an adjusting screw 65 in a bracket 66, secured to the housings 3 and 4 of the machine. The other end of this spring 64 engages one end of a lever 67, and by raising this lever the tension on the spring 64 can be released, which will disengage the gear wheels 62 and 59 and their attached disks 60 and 63. By adjusting the screw 65, the tension of the spring can be readily regulated in order to provide the proper friction on the stay wire 68 which passes through an orifice and guide 69 above the bracket 66. This stay wire passes from the guide 69, between the disks 60 and 63, to and through a tubular guide 70 mounted in the frame 25. The upper end of this guide lies adjacent to the projections 28 of its twisting spindle 27, and guides the wire 68 under the strand wire 71, passing through this spindle and over the stay wire in the adjacent spindle. Mounted adjacent to the end of each of the tubes 70 is a stationary cutter 72, and mounted on a vibrating frame 73 is a plurality of movable cutters 74, each of which is adapted to coact with one of the cutter blades 72 adjacent to the mouth of the guide tube 70. Immediately after the stay wire has been moved forward by the feeding mechanism just described, the frame 73 is elevated and shears the stay wires 68 adjacent to the ends of the tubes. The movable cutter frame 73 is provided with an eccentric strap 74ª at each end thereof. Each of these straps surrounds an eccentric 75 on the shafts 76, and mounted on the end of each of these shafts are crank levers 77 which are connected together by means of a link 78. One of these crank levers 77 is provided with an extension 79, which is connected by means of a link 80 with a crank 81 on the crank shaft 46.

Loosely mounted on each end of the shaft 12 is a frame 82, and journaled within this frame are rollers 83 and 84. Each of these frames is provided with an adjustable block 85 having two orifices 85ª, each of which is adapted to receive a pivot pin of a link 86, the other end of which link is connected to a crank 87 on the shaft 15. The rotation of the cranks 87 will oscillate the frame 82 and with it the rollers 83 and 84. By changing the connections between the links 86 and holes 85ª in the blocks 85, or by adjusting the blocks, the oscillation of the frame 82 can be varied.

88 is a guide bar which is secured to the housings 3 and 4, and is provided with orifices 89 for guiding the strand wires 71 from their coils to the machine. Each of these strand wires passes around the drum 90, and thence through the spindle 27. From the spindles 27 the strand wires 71 pass around a drum 91, and from the drum 91 they pass under the roller 83, and over the roller 84. The fabric then passes from the roller 84 around one-half of the pull-out drum 24, and thence to a winding drum or reel 92. This winding drum 92 is composed of the end socket pieces 93, each of which is secured to a short shaft 94 which extends through the housings of the machine, and is positively driven by means hereinafter described. Each of these socket members is adapted to receive the semi-circular wooden wedges 95, and 96 is a ring which engages the periphery of one of the socket pieces 93 and a portion of one end of the wedges 95. The end of the fabric is inserted in the recess between the wedges 95, and is then rotated by frictional mechanism hereinafter described. When it is desired to remove a roll of fabric from the machine, the outer layer of the fabric is secured to the roll, and the fabric is then cut along the line of the stay wires. The roll is then rotated so that the side opening in the annular flanges 93ª of the end of the machine (see Figs. 5 and 12), and the rings 96 are then released from the socket pieces, and the roll and wedges can then be withdrawn from the machine, and the wedges are then withdrawn from the roll of fabric. The wedges are then inserted into the socket pieces and the rings driven home to secure the wedges therein, and the fabric is again started on the roll.

Mounted on the shaft 20 is a gear wheel 97 which meshes with a gear wheel 98. Loosely mounted on a shaft 99 and secured to the gear wheel 98 is a disk 100. Secured to the shaft 99 is a band wheel 101, and secured to the disk 100 is a bracket 102, which is provided with a series of hooks 103, to which are connected the ends of cables 104, these cables passing around the band wheel 101, and the other ends thereof being connected to adjustable hooks 105 mounted in the bracket 102. By adjusting the hooks 105 the tension of the cables 104 on the band wheel 101 may be regulated. The disk 100 together with the cables 103 are positively rotated by means of the gearing hereinbefore described, and through the medium of the tension of the cables on the band wheel 101, the shaft 99 is driven to wind up the fabric on the drum. Connected to each end of the shaft 99 is a pinion 106. Each of these pinions meshes with a gear wheel 107 which is loosely mounted on the end of a shaft 94, and splined to each of the shafts 94, and adjacent to the gear wheels 107 is a ratchet wheel 108. Connected to each of the gear wheels 107 is a pawl 109 which engages the teeth of the ratchet 108 to rotate the shafts 94, and with them the drum 92. The pawl and ratchet connection between the shafts 94 and the gear wheel 107 is provided so that the slack in the fabric in first securing the same to the winding drum can be taken up, after which the roll will be positively driven through the medium of the pawl and ratchet connections.

The winding drum 92 is reciprocated endwise so as to zigzag the fabric, or in other words, to prevent the twisted ends of the stay wires from piling on top of each other. This reciprocation is accomplished by the following mechanism: Secured to the outer end of one of the shafts 94 is a pinion 111, which meshes with a gear 112 on the end of a short shaft 113. Mounted on this shaft 113 is a cam 114 having a groove 115 engaged by a pin on a collar 116 which is loosely mounted on the shaft 94, so as to permit the shaft to rotate therein, but which is prevented from lateral motion on said shaft by means of the collars 117. The rotation of the cam 114 will reciprocate the shaft 94, and with it the drum 92 to zigzag the fabric, as hereinbefore described.

Connected to the end of shaft 20 is a sprocket wheel 118ª adapted to receive a sprocket chain 118, which sprocket chain is adapted to drive a sprocket wheel 119 of the register 120, to register the number of feet of fabric made on the machine.

The strand wires 71 pass through the guides 89 in the bar 88, and from these guides they pass to the tension drum 90, around which they make one or more turns according to the tension required. These wires then pass from the tension drum through the stay wire coiling spindles 27, through which they are intermittently drawn by the rolls 83 and 84 of the vibrator. The driving mechanism is so timed that the strand wires are drawn through the stay wire coilers while the rack-bar 40 is on the return stroke, at which time the spindles 27 are held stationary by the pawls and ratchets 34 and 33 on the ends of the spindles.

During the return stroke of the rack-bar 40, the pawl 56 is in engagement with one of the teeth of the ratchet wheel 55, and is advanced the distance of one tooth, which will rotate the shaft 58, and the gears 59 secured thereto one-half of a circle, through the medium of the gears 54 and 57. The gears 59, through the medium of the gears 62 rotate the disks 60 and 63. Each set of these disks feeds the required length of stay wire from the end of a tube 70 above the lower projection 28 on the adjacent coiling spindle and below the strand wire passing therethrough, and under the upper projection 28 on the next spindle and over the strand wire passing therethrough. (See Fig. 9.)

Immediately after the stay wires are fed to the spindles and before the completion of the return stroke of the rack-bar, the shear frame 73 is raised by means of its eccentrics and operating connections with the crank shaft 46, to shear the stay wires by means of the cutters 72 and 74. At the time that the rack-bar has completed its return stroke, or just prior thereto, the vibrator will begin to move from the dotted line position toward the full line position. (See Fig. 12.) During this movement of the vibrator the strand wires are stationary in the spindles 27 of the coilers. The rack-bar 40 is now advanced, and rotates the spindles 27 of the coilers, through the medium of the pinions 36 and their clutch connections to coil the ends of each stay wire around adjacent strand wires.

The foregoing operations are repeated for each set of stay wires of the fabric.

The fabric passes from the coilers over an idle drum 91, thence under and over the respective rollers 83 and 84 of the vibrator, then around the pull-out drum 24 which is provided with suitable mechanism to grasp the strand wires and continuously feed the fabric forward. This pull-out drum also resists the tendency of the vibrator to draw the fabric backward when the vibrator is actuated to draw the strand wires through the coiling spindles.

The fabric passes from the pull-out drum 24 to the winding drum 95, which is rotated by the frictional driving mechanism hereinbefore described, and is wound into proper-sized bundles. This winding drum is slowly reciprocated by means of the cam 114 on the shaft 113, so that the coiled ends of the stay wires will not rest on the underlying strand wires, and thereby produces a tight and compact bundle in which the body of the stay wires rests on the strand wires.

An advantage of my invention results from the provision of a balanced vibrator which engages both sides of the fabric for intermittently drawing the strand wires through the coilers. Also from the provision of means for adjusting the stroke of the vibrator to increase or decrease the length of strand wires drawn at each oscillation of the vibrator.

Another advantage results from the provision of self-contained coiling spindles, rotatably mounted in individual bearings removably secured to a spindle frame, so that each bearing and the coiler mounted therein can readily be withdrawn from the spindle frame without dismantling any other part of the machine.

Still another advantage results from the provision of the spring-pressed, pivoted frames for the stay wires, each of said frames having journaled thereon one of the disks for feeding its stay wire. Further, from the provision of independent means for adjusting the tension of each set of stay wire feeding disks, and from the means for readily disengaging each set of stay wire feeding disks so as to allow the insertion of the stay wires.

Still another advantage of my invention results from the provision of a frictional driving mechanism on the shaft of the winding drum, the tension of which can readily be adjusted so as to wind the fabric on the drum at an equal tension irrespective of the diameter of the roll of fabric, and also from the provision of means whereby a roll of fabric may be readily removed from the winding drum.

Still another advantage of my invention results from the provision of means for feeding the strand wires to the machine in a horizontal plane, and so arranging the mechanism that the various parts are readily accessible from the base. The locating of the fabric forming mechanism and driving gears between upright housings and adjacent to the base plate permits the machine to be driven at a high rate of speed, without undue vibration to the various parts of the mechanism.

I claim:

1. A wire fabric machine, having a plurality of guides for the strand wires, means for feeding and guiding each of a line of stay wires across two strand wires, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

2. A wire fabric machine, having a plurality of guides for the strand wires, means for feeding and guiding each of a line of stay wires across two strand wires, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means comprising a crank shaft to oscillate said rolls to intermittently draw the strand wires through the coilers; substantially as described.

3. A wire fabric machine, having a plurality of guides for the strand wires, means for feeding and guiding each of a line of stay wires across two strand wires, a coiler surrounding each strand wire for coiling the ends of the stay wires around the strand wires to form the fabric, a drum for continuously clamping and advancing the fabric, a pair of rolls mounted in an oscillating frame, said rolls engaging opposite sides of the fabric between the coilers and the pull-out drum, and means to oscillate said frame to intermittently draw the strand wires through the coilers; substantially as described.

4. A wire fabric machine, having a plurality of guides for the strand wires, means for feeding and guiding each of a line of stay wires across two strand wires, a coiler surrounding each strand wire for coiling the ends of the stay wires around the strand wires to form the fabric, a drum for continuously clamping and advancing the fabric, a pair of rolls mounted in an oscillating frame, said rolls engaging opposite sides of the fabric between the coilers and the pull-out drum, a crank shaft, and connections between the crank shaft and said frame to oscillate said frame to intermittently draw the strand wires through the coilers; substantially as described.

5. A wire fabric machine, having a plurality of guides for the strand wires in the same horizontal plane, means for feeding and guiding the stay wires across the strand wires, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

6. A wire fabric machine, having a plurality of guides for the strand wires, means for guiding each of a line of stay wires across two strand wires, independent means for feeding each stay wire, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

7. A wire fabric machine, having a plurality of guides for the strand wires, means for guiding each of a line of stay wires across two strand wires, independent means for feeding each stay wire, means for independently regulating the pressure of the stay wire feeding devices, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

8. A wire fabric machine, having a plurality of guides for the strand wires, means for guiding each of a line of stay wires across two strand wires, independent means for feeding each stay wire, means for independently regulating the pressure of the stay wire feeding devices, means for independently disengaging each of the said stay wire feeding devices, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

9. A wire fabric machine, having a plurality of guides for the strand wires, means for feeding and guiding each of a line of stay wires across two strand wires, a coiler surrounding each strand wire for coiling the ends of the stay wires around the strand wires to form the fabric, a drum for continuously clamping and advancing the fabric, gears for varying the speed of the drum, a pair of oppositely movable rolls engaging opposite sides of the fabric between the coilers and the pull-out drum, and means to oscillate said rolls to intermittently draw the strand wires through the coilers; substantially as described.

10. A wire fabric machine, having a plurality of guides for the strand wires, means for feeding and guiding each of a line of stay wires across two strand wires, means to cut the stay wires to length, a coiler surrounding each strand wire for coiling the ends of the stay wires around the strand wires to form the fabric, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

11. A wire fabric machine, having a plurality of guides for the strand wires, means for feeding and guiding each of a line of stay wires across two strand wires, means to cut the stay wires to length, a coiler surrounding each strand wire for coiling the ends of the stay wires around the strand wires to form the fabric, means to rotate the coilers, means connected to the spindle-actuating means to operate the stay-wire cutting means, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

12. A wire fabric machine, having a plurality of guides for the strand wires, means for feeding and guiding each of a line of stay wires across two strand wires, a stationary cutter adjacent to the end of each guide, a coiler surrounding each strand wire for coiling the ends of the stay wires around the strand wires to form the fabric, a reciprocating rack for rotating the coilers, a rotary crank shaft, actuating connections between the crank shaft and the rack, an oscillating frame having cutter blades to coact with each of the cutters adjacent to the ends of the guides, actuating connections between the cutter blade frame and said crank shaft, a drum for continuously clamping and advancing the fabric, a pair of oppositely movable rolls engaging opposite sides of the fabric between the coilers and the pull-out drum, and means to oscillate said rolls to intermittently draw the strand wires through the coilers; substantially as described.

13. A wire fabric machine, comprising means driven at a uniform speed to draw the fabric through the machine, a winding drum to receive the fabric, a friction pulley secured to the shaft of said winding drum, a rotatable member loosely mounted on the drum shaft, means to drive this rotatable member at a uniform speed, and an adjustable friction drive between the rotatable member and the friction band to rotate said winding drum to wind the fabric; substantially as described.

14. In a wire fabric machine, a coiler frame having bearings for the coilers thereon, and a plurality of coilers rotatably mounted in the bearings on said frame and adapted to be withdrawn endwise therefrom in removing and replacing the coilers; substantially as described.

15. In a wire fabric machine, a coiler having one end rotatably mounted in a frame, and a removable bearing secured to the frame adapted to receive the other end of the coiler; substantially as described.

16. A coiler for a wire fabric machine comprising a tube to receive one of the wires of the fabric, a frame having bearings for one end of the sleeve, and a bearing mounted on the other end of the tube and secured to the frame; substantially as described.

17. A wire fabric machine comprising means to feed a plurality of strand wires, means for feeding and guiding each of a line of stay wires, a tension device for each stay wire feeding device, and means for adjusting each tension device; substantially as described.

18. A wire fabric machine comprising means to feed a plurality of strand wires, feeding mechanism for each of a line of stay wires, actuating means for operating said feeding mechanism, and means for disconnecting said actuating means; substantially as described.

19. A wire fabric machine comprising a main frame, a plurality of gear wheels connected to a common shaft, a disk secured to each of said gear wheels, a plurality of frames pivotally supported on the main frame, a gear wheel mounted in each of the pivoted frames, a disk secured to each of said last mentioned gears, each of the gears and disks in said frames being in alinement with one of the first mentioned gears and disks and coacting therewith to feed one of a line of stay wires, and means to actuate said gear wheels; substantially as described.

20. A wire fabric machine comprising a main frame, a plurality of gear wheels connected to a common shaft, a disk secured to each of said gear wheels, a plurality of frames pivotally supported on the main frame, a gear wheel mounted in each of the pivoted frames, a disk secured to each of said last mentioned gears, each of the gears and disks in said frames being in alinement with one of the first mentioned gears and disks and coacting therewith to feed one of a line of stay wires, means to actuate said gear wheels, and an adjustable tension device for each frame; substantially as described.

21. A wire fabric machine comprising fabric forming mechanism, and a vibrator having oppositely disposed rocking members to contact with opposite sides of the fabric and adapted to advance the fabric intermittently; substantially as described.

22. A wire fabric machine comprising fabric forming mechanism, a frame having oppositely disposed rocking rolls mounted therein and adapted to engage opposite sides of the fabric, and means to oscillate said frame to rock said rolls and advance the fabric intermittently; substantially as described.

23. A wire fabric machine comprising fabric forming mechanism, a reel for reeling said fabric, means to rotate the reel, and means to reciprocate said reel during its rotation to wind the fabric on an irregular line; substantially as described.

24. A wire fabric machine comprising fabric forming mechanism, a reel for reeling said fabric, means to rotate the reel, and a cam to reciprocate said reel during its rotation to wind the fabric on an irregular line; substantially as described.

25. A wire fabric machine comprising fabric forming mechanism, a shaft having a reel thereon for reeling said fabric, an adjustable friction device on said shaft, and means to rotate said friction device; substantially as described.

26. A wire fabric machine comprising fabric forming mechanism, a vibrator adapted to intermittently draw the fabric through the machine, operating connections for operating the vibrator, and means to adjust the operating connections to vary the stroke of the vibrator; substantially as described.

27. A wire fabric machine comprising fabric forming mechanism, a vibrator adapted to intermittently draw the fabric through the machine, an operating rod connected to the vibrator, means to move the operating rod, and an adjustable connection between the vibrator and the operating rod to vary the stroke of the vibrator; substantially as described.

28. A wire fabric machine comprising fabric forming mechanism, a vibrator having oppositely disposed members to contact with opposite sides of the fabric and adapted to advance the fabric intermittently, operating connections for the vibrator, and means to adjust said operating connections to vary the stroke of the vibrator; substantially as described.

29. A wire fabric machine comprising rotatable stay wire coilers, means for rotating the coilers, and adjusting means whereby the rotative movement of said coilers is varied and controlled; substantially as described.

30. A wire fabric machine comprising rotatable stay wire coilers, a reciprocating rack-bar for rotating the coilers, means for reciprocating the rack-bar, and means for adjusting the stroke of the rack-bar to vary the rotative movement of said coilers; substantially as described.

31. A wire fabric machine comprising rotatable stay wire coilers, a rack-bar for rotating the coilers, a lever arranged to reciprocate the rack-bar, means for actuating said lever, and adjustable means for changing the stroke of said lever to lessen and increase the reciprocating movement of the rack-bar and thereby vary the rotative movement of said coilers; substantially as described.

In testimony whereof, I have hereunto set my hand.

GEORGE HENRY SMITH.

Witnesses:
A. F. BACKLIN,
WM. A. BACON.

Copies of this patent may be obtained for five cents each, by addressing the "Commissioner of Patents, Washington, D. C."